United States Patent [19]

Vornberger

[11] E Re. 30,202

[45] Reissued Feb. 5, 1980

[54] CEMENT APPLYING MECHANISM

[75] Inventor: Walter Vornberger, Tewksbury, Mass.

[73] Assignee: International Shoe Machine Corporation, Nashua, N.H.

[21] Appl. No.: 874,184

[22] Filed: Feb. 1, 1978

Related U.S. Patent Documents

Reissue of:

[64] Patent No.: 3,901,181
Issued: Aug. 26, 1975
Appl. No.: 499,822
Filed: Aug. 23, 1974

[51] Int. Cl.[2] ..... B05C 11/10; B05C 5/02

[52] U.S. Cl. ..... 118/705; 118/411

[58] Field of Search ..... 118/7, 408, 410, 411, 118/317, 321, 323

[56] References Cited

U.S. PATENT DOCUMENTS

| | | | |
|---|---|---|---|
| 2,294,472 | 9/1942 | MacKenzie | 118/411 X |
| 3,304,563 | 2/1967 | Fino | 118/410 X |
| 3,444,571 | 5/1969 | Harriman | 118/411 X |

FOREIGN PATENT DOCUMENTS

| | | | |
|---|---|---|---|
| 1297122 | 11/1972 | United Kingdom | 118/411 |

*Primary Examiner*—John P. McIntosh
*Attorney, Agent, or Firm*—Albert Gordon

[57] ABSTRACT

A mechanism, operable on a shoe assembly comprised of a last having an upper mounted thereon and an insole located on its bottom, for applying cement in a cement applying stroke along the corner formed by the upper margin and the insole periphery between an initial location at a boundary between the lasted toe portion of the shoe assembly and an unlasted side portion of the shoe assembly and a final location at the heel end extremity of the shoe assembly. The cement is applied by a nozzle that is movable rearwardly in the cement applying stroke and that is swingable about a heightwise axis during its rearward movement. The cement is applied from the nozzle into the corner through a passage that extends radially from the upright axis. At the beginning of the cement applying stroke the passage is directed laterally and outwardly of the axis and the nozzle is caused to so swing rearwardly and inwardly during the latter part of the cement applying stroke that the passage is directed generally rearwardly from the axis when the nozzle has arrived at the final location.

4 Claims, 13 Drawing Figures

FIG. 5
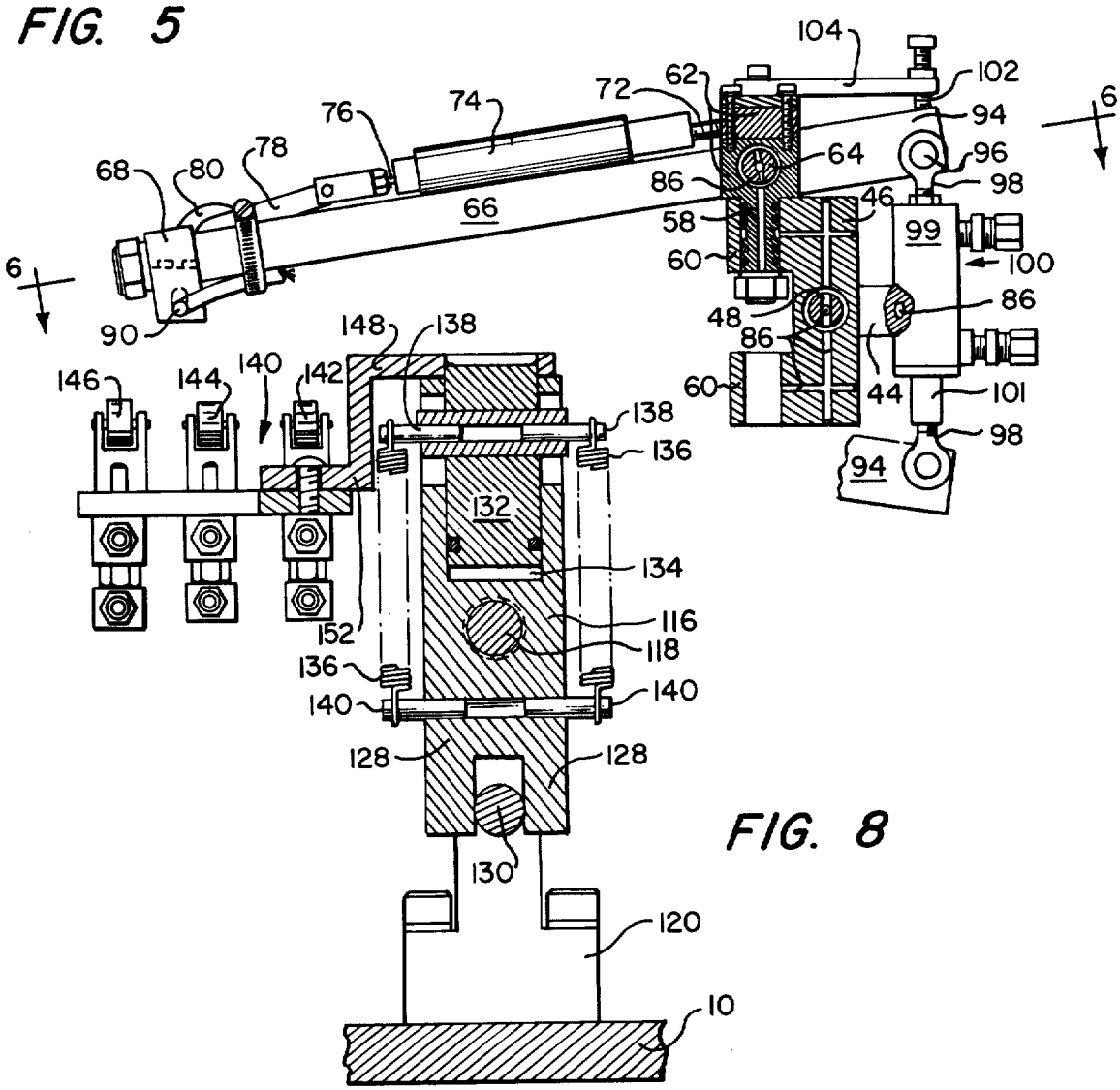
FIG. 8
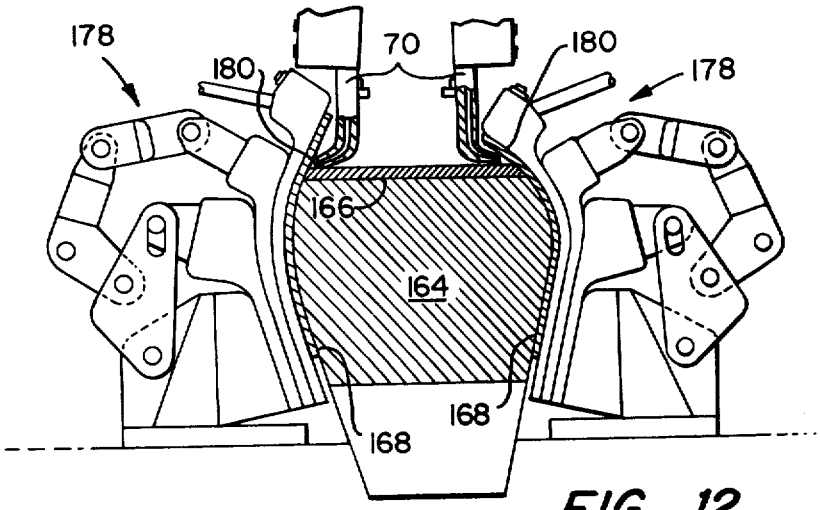
FIG. 12

CEMENT APPLYING MECHANISM

Matter enclosed in heavy brackets [ ] appears in the original patent but forms no part of this reissue specification; matter printed in italics indicates the additions made by reissue.

BACKGROUND OF THE INVENTION

In [pending patent application Ser. No. 467,522 filed May 6, 1974] *U.S. Pat. No. 3,963,840,* there is disclosed a cement applying mechanism that includes a nozzle mounted for movement in a rearward direction in a cement applying stroke along the periphery of a workpiece, the workpiece being disclosed as a shoe assembly comprised of an upper mounted on a last and an insole located on the last bottom. The cement applying stroke commences at an initial location, disclosed as a boundary between the lasted toe portion of the shoe assembly and an unlasted side portion of the shoe assembly, and terminates at a final location, disclosed as the heel and extremity of the shoe assembly. The nozzle has a cement flow directing means, in the form of a nozzle passage, through which cement is extruded from the nozzle along the workpiece periphery, disclosed as being the corner between the upper margin and the insole periphery, during the cement applying stroke. The nozzle is directed laterally of the rearward direction and outwardly thereof during the entire cement applying stroke. The periphery of the rearmost region of the workpiece (the heel portion of the shoe assembly) curves rearwardly and inwardly so that difficulties have arisen in enabling the nozzle to apply cement onto the rearward extremity (the heel end extremity) of the workpiece due to the fact that the nozzle is directed laterally and outwardly of the rearward direction of nozzle movement during the entire cement applying stroke.

SUMMARY OF THE INVENTION

In accordance with this invention, the nozzle mounting is improved in such a manner as to enable it to apply cement along the entire periphery of the workpiece, including its rearmost extremity, during the entire cement applying stroke. This is achieved by so mounting the nozzle for swinging movement about an upright axis that the cement flow directing means extends radially from the axis. During the rearward movement of the nozzle, in the cement applying stroke, from the initial location to an intermediate location at the front of the rearwardly and inwardly curving portion of the workpiece the nozzle is caused to be so constrained that the cement flow directing means is directed laterally and outwardly of the rearward direction, similarly to the nozzle in [application Ser. No. 467,522] *U.S. Pat. No. 3,963,840.* When the nozzle has arrived at the intermediate location it is caused to so swing rearwardly and inwardly about the axis that the cement flow directing means is directed rearwardly from the axis when the nozzle has arrived at its final location.

BRIEF DESCRIPTION OF THE DRAWINGS

FIG. 5 is a plan view of the cement applying mechanism;

FIG. 8 is a section taken along the line 8—8 of FIG. 2;

FIG. 12 is a view showing the nozzle as it appears when applying cement to the workpiece during the cement applying stroke.

DESCRIPTION OF THE PREFERRED EMBODIMENT

Figure 1:
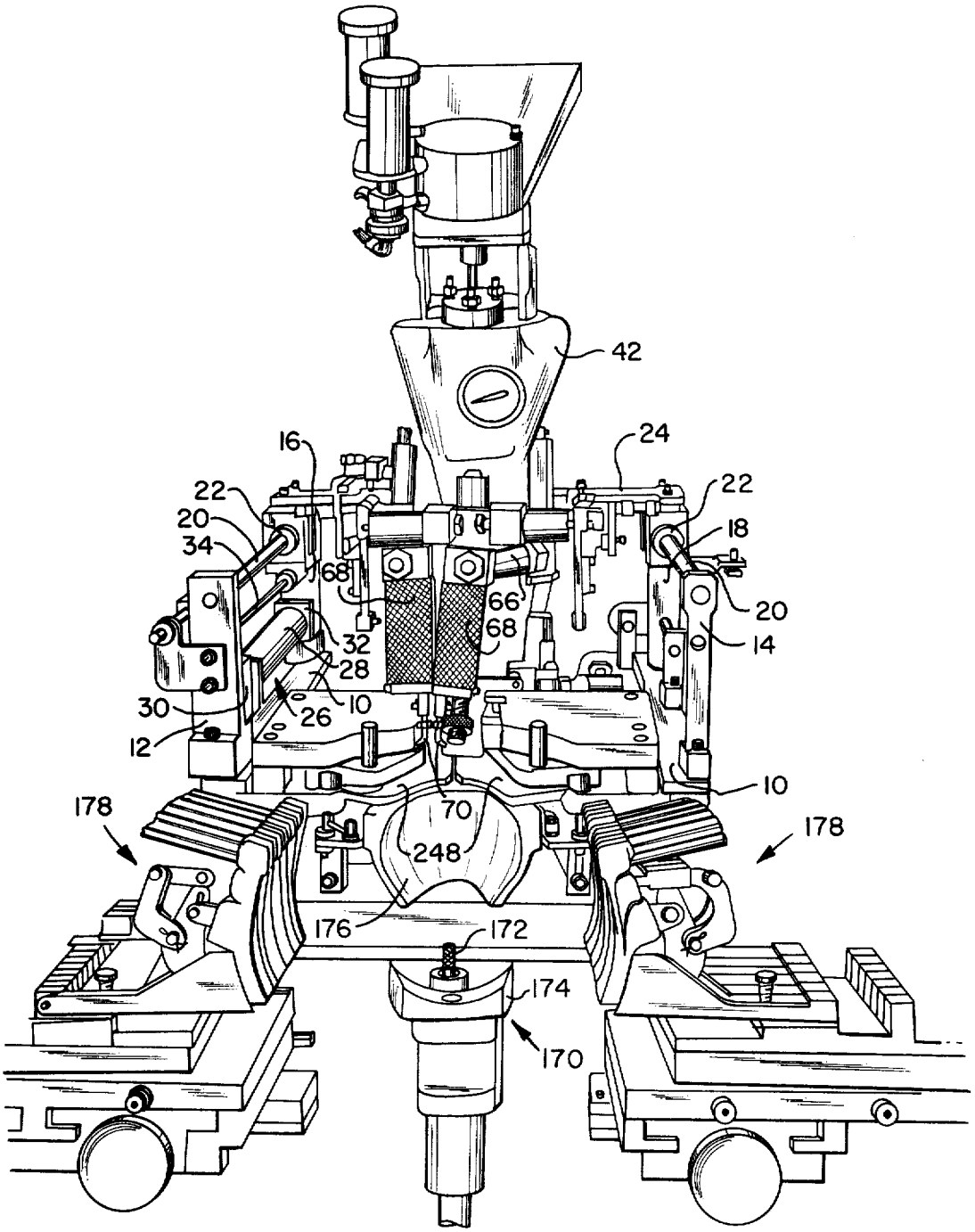
FIG. 1 is a front elevation of a machine incorporating the cement applying mechanism.
Figure 2:
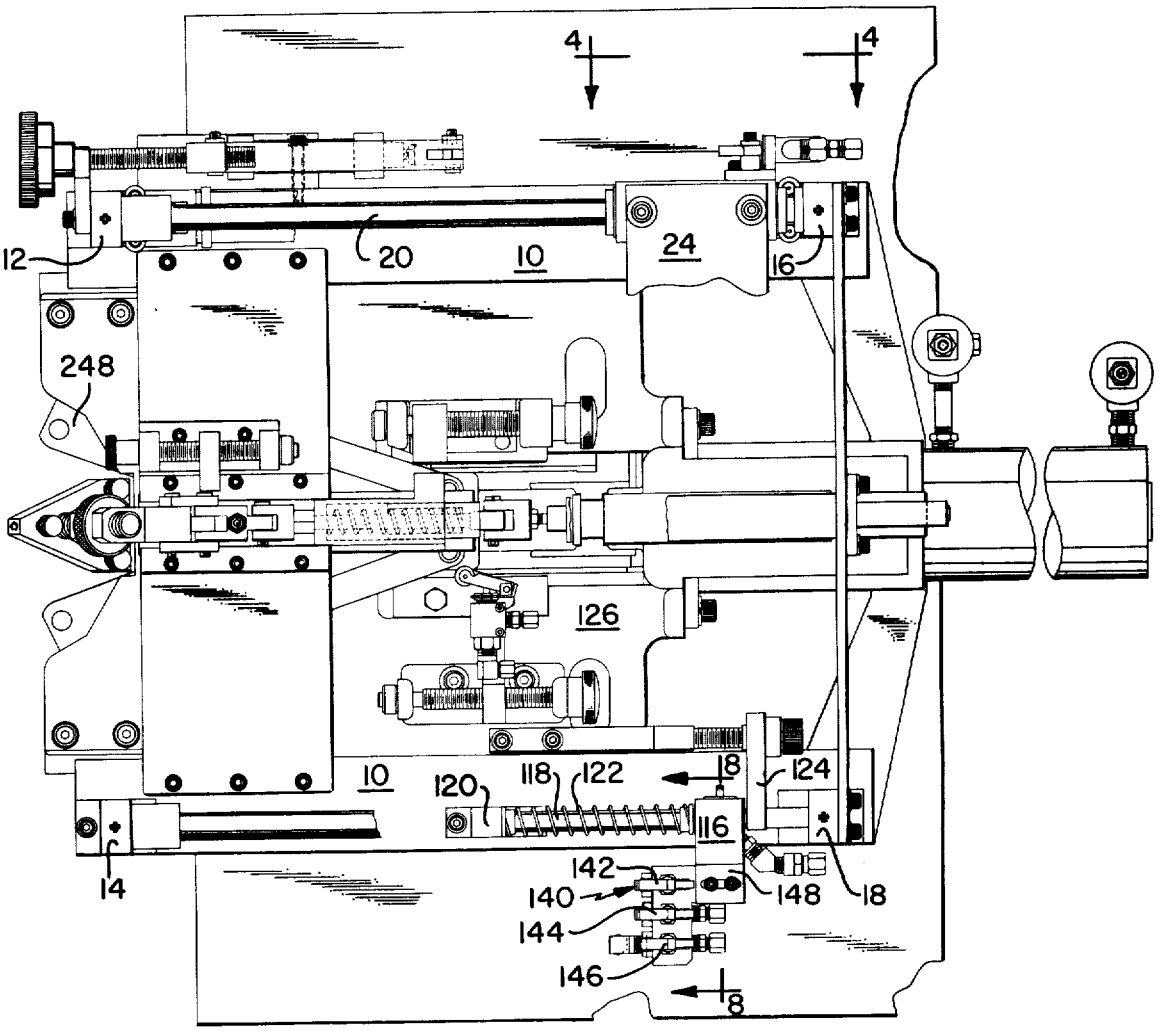
FIG. 2 is a plan view of a portion of the machine.
Figure 3:
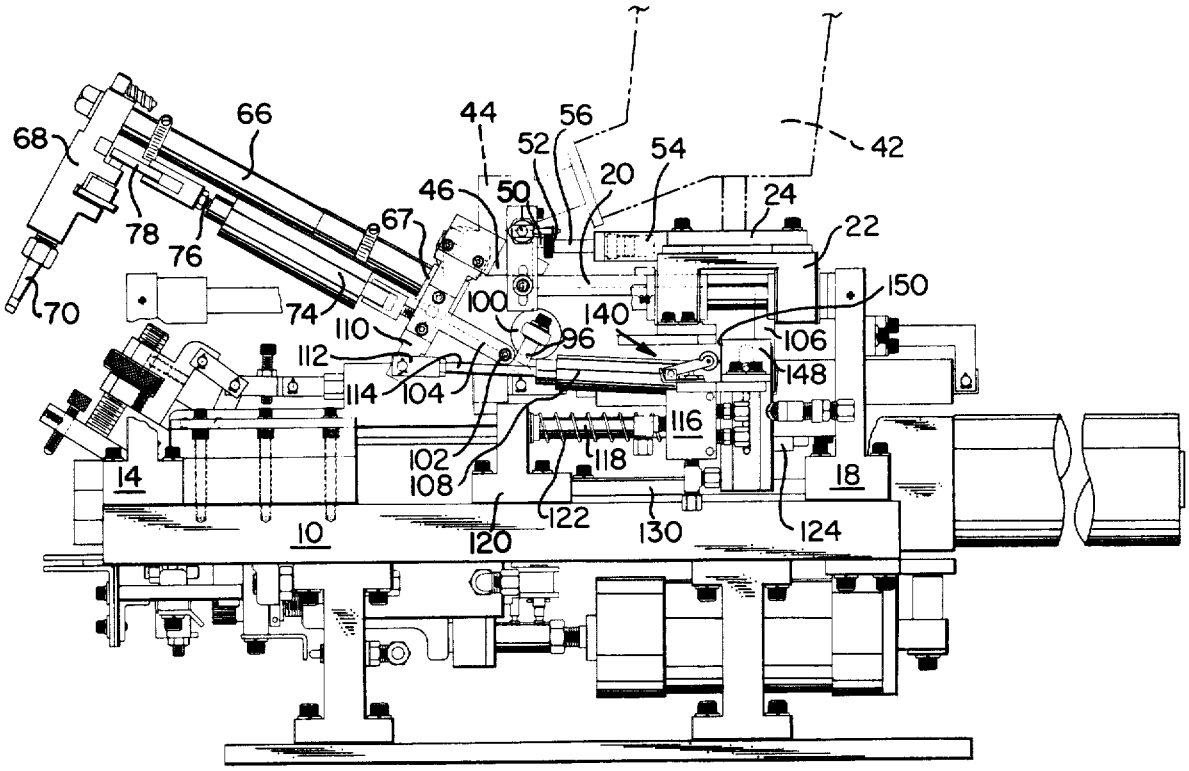
FIG. 3 is a side elevation of a portion of the machine.
Figure 4:
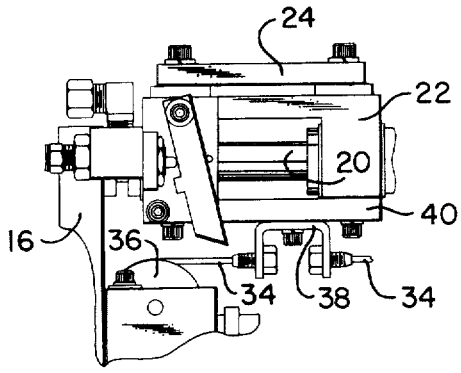
FIG. 4 is a view taken along the line 4—4 of FIG. 2.

The operator is intended to stand in front of the machine as seen in FIG. 1 and to the left of the machine as seen in FIG. 3. Directions extending towards the operator (right to left in FIG. 3) will be designated as "forward" and directions extending away from the operator (left to right in FIG. 3) will be designated as "rearward". The front of the machine is closest to the operator and the back of the machine is furthermost from the operator.

Referring to FIGS. 1–4, the machine incorporates a head 10. A pair of front posts 12 and 14 and a pair of back posts 16 and 18 are upstanding from the head 10. The two front posts and the two back posts are located on opposite sides of the head 10 and a pair of slide rods 20 extend between the posts 12 and 16 and between the posts 14 and 18 so as to be located on opposite sides of the head 10 and so as to extend in forward-rearward directions. Bearing blocks 22 are slidably mounted on the slide rods 20 for forward-rearward movement and a slide plate 24 extends between the slide rods 20 and is secured to the bearing blocks 22.

An air actuated motor 26, comprising a cable cylinder 28, extends between the posts 12 and 16 and is mounted to blocks 30 and 32 that are respectively secured to the posts 12 and 16. Cables 34, forming parts of the motor 26, are secured to the opposite faces of a piston (not shown) that is slidably mounted in the cylinder 28 (see FIG. 4). The cables extend about pulleys 36 that are rotatably mounted in the blocks 30 and 32, as shown in greater detail in [application Ser. No. 467,522] *U.S. Pat. No. 3,963,840,* and the ends of the cables remote from the piston in the cylinder 28 are anchored to a clip 38 that is mounted to a strap 40. The strap 40 is fastened to one of the bearing blocks 22. Thus, actuation of the motor 26 will move the clip 38 forwardly or rearwardly to thereby move the slide plate 24 and the parts carried forwardly or rearwardly.

A cement pot 42 which is shown in greater detail in [application Ser. No. 467,522] *U.S. Pat. No. 3,963,840,* is mounted to the slide plate 24 for forward-rearward movement therewith.

Referring to FIGS. 3 and 5, a prong 44 is secured to and extends downwardly and forwardly of the cement pot 42. A block 46 is pivoted to a post 48 extending upwardly of the front of the prong 44 for swinging movement about the upright axis of the post 48. A stabilizer bolt 50 having a rearwardly extending head 52 is mounted to each side of the block 46. A pair of single acting spring return air operated motors 54, only one of which is shown in FIG. 3, are so mounted to the slide plate 24 that their forwardly directed piston rods 56 are in alignment with the bolt heads 52.

A pair of aligned spindles 58 (FIG. 5) are mounted for swinging movement about a horizontal axis in projections 60 of the block 46, the spindles having extensions 62 that extend outwardly of the block 46. A heightwise extending spindle 64 is swingably mounted in each spindle extension 62 and a nozzle carrier 66 is mounted to an extension 67 of each spindle 64 so as to extend forwardly thereof. A nozzle holder 68 is formed at the front of each nozzle carrier 66 and a nozzle 70 is mounted to and depends downwardly of each nozzle holder 68.

Figure 6:
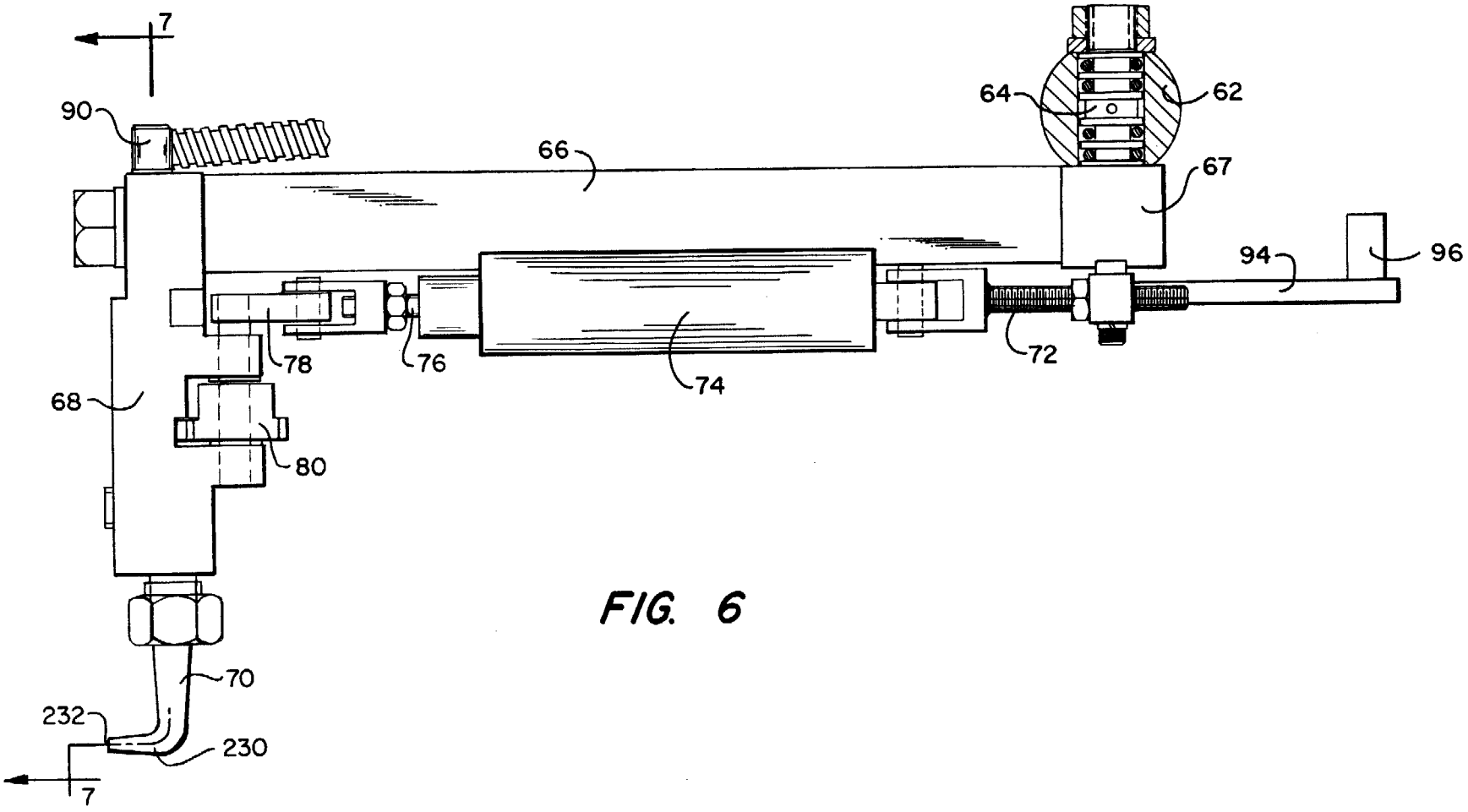
FIG. 6 is a view taken along the line 6—6 of FIG. 5.
Figure 7:
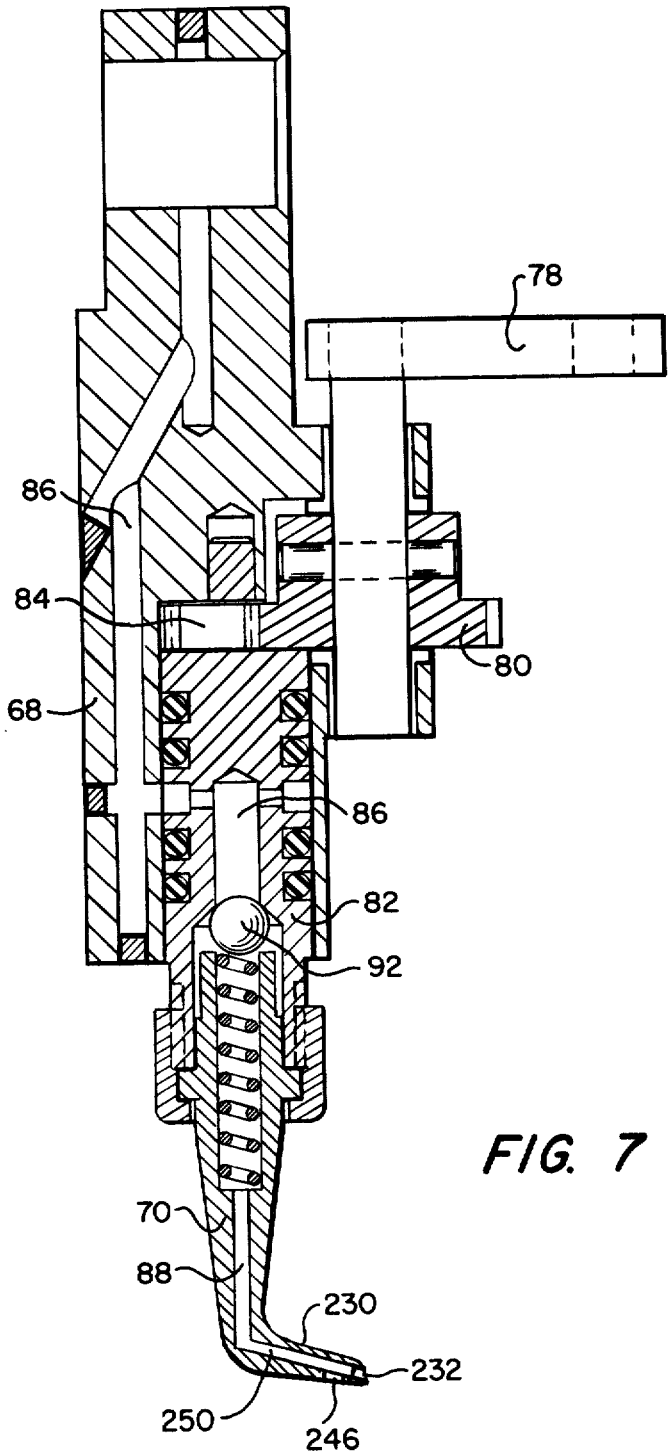
FIG. 7 is a section taken along the line 7—7 of FIG. 6.
Figure 9:
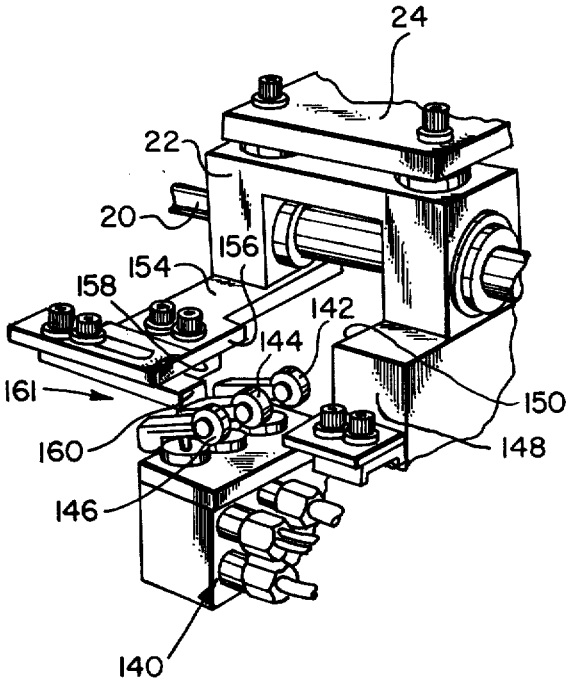
FIG. 9 is an isometric view of an actuating and operating arrangement for causing swinging movement of the nozzle.

Referring to FIGS. 5–7, a screw 72 is adjustably mounted to the back of each nozzle carrier 66. The front of each screw 72 pivotally mounts an air operated motor 74. Each motor 74 has a forwardly directed piston rod 76 that is pivotally connected to an arm 78. Each arm 78 is rotatably mounted in its associated nozzle holder 68 and is rigidly connected to a gear 80. Each nozzle 70 is affixed to a mount 82 that is rotatably mounted in its associated holder 68 for swinging movement about an upright axis. A gear is rigidly connected to each mount 82 and is in mesh with its associated gear 80.

An interconnected passage means 86 provides communication between the cement pot 42 and passages 88 located in each of the nozzles 70 through the prong 44, the post 48, the spindles 58,, the spindle extensions 62 and the spindles 64. Strategically located electric cartridge heaters, such as the heater 90 shown in FIGS. 5 and 6, serve to maintain the cement that is in the passage means 86 and the passages 88 molten. A check valve 92 in each nozzle mount 82 yieldably blocks the flow of cement through the passage means 86.

Each spindle extension 67 has a bar 94 extending rearwardly thereof that has a bar 96 projecting from its back end. Each bar 96 is mounted to a yoke 98. One of the yokes 98 is secured to the cylinder 99 (FIG. 5) of an air operated motor 100 and the other yoke 98 is secured to the piston rod 101 of this motor. As described below, the operation of the motor 100 serves to swing the nozzle carriers 68 and the bars 94 about the axes of the spindles 64. The extent of outward movement of the bars 94 and the extent of the inward movement of the nozzle carriers 66 is determined by the engagement of the bars 94 with stop bolts 102 that are located outwardly of the bars 94 and are mounted to bars 104 that in turn are secured to their associated block extensions 62. A post 106 is mounted to each side of the block 46 in the manner shown in [application Ser. No. 467,522] *U.S. Pat. No. 3,963,840*. An air operated motor 108 is pivoted to the bottom of each post 106. A lug 110, depending downwardly of and connected to each spindle extension 62, is pivoted to a clevis 112 that is secured to the piston rod 114 of its associated motor 108, the piston rods 114 projecting forwardly of the motors 108.

Referring to FIGS. 2, 3, 8 and 9, a block 116 is slidably mounted for forward-rearward movement on a shaft 118. The shaft 118 is fixed to and extends between the back post 18 and a pillar 120 that is mounted to the head 10. A compression spring 122, entwined about the shaft 118 between the block 116 and the pillar 120, acts to yieldably urge the block 116 rearwardly along the shaft 118. A lug 124 is rigidly mounted to a slide plate 126 and is movably mounted on the shaft 118 rearwardly of the block 116 so as to be engaged by the back of the block 116 and thus limit the extent of rearward movement of the block 116 under the influence of the spring 122. Depending lugs 128 on the block 116 straddle a rod 130 that is located below the shaft 118 and is secured to the post 18 and the pillar 120. An air operated cylinder 132 is mounted for heightwise movement in a cavity 134 in the block 116 and is resiliently urged downwardly of the block by tension springs 136 that extend between pins 138 anchored to the cylinder 132 and pins 140 anchored to the block 116. The bottom of the cavity 134 is in communication with a source of pressurized air. A valve assembly 140, formed of three valves 142, 144 and 146, is mounted to a flange 148 that is secured to the top of the cylinder 132. The valve assembly 140 is offset outwardly of the cylinder 132. The flange 148, which forms a stop member, includes a forwardly facing stop surface 150 (FIG. 9) that is approximately at the level of the top of the cylinder 132, and a lower surface 152 to which the valve assembly is mounted. A beam 154 is mounted to the bearing block 22 associated with the back post 18. When the cylinder 132 has been raised to an upper position, as described below, the beam 154 is in alignment with the stop surface 150. When the cylinder 132 has been raised to this upper position, cams 156, 158 and 160 (FIG. 9) of a cam assembly 161 that is mounted to the beam 154 are respectively in alignment with the valves 142, 144 and 146. The valve assembly 140 is located forwardly of the stop surface 150. The cam assembly 161 is so located that the cams 156, 158 and 160 respectively engage the valves 142, 144 and 146 during rearward movement of the beam 154, as described below, before the back of the beam 154 engages the stop surface 150.

In the idle condition of the machine, the motor 26 is so actuated as to cause the cables 34 to locate the slide plate 24 and the parts carried thereby, including the cement nozzles 70, in a rearward position with the beam 154 and the cam assembly 161 located rearwardly of the valve assembly 140 and the flange 148; the piston rods 56 are projecting out of the motors 54 under relatively low pressure so that the block 46, together with the nozzles 70, is restrained against movement about the upright axis of the post 48; the piston rods 76 are retracted into the motor 74; the cylinder 99 and the piston rod 101 of the motor 100 are extended away from each other so that the nozzles 70 are swung about the axes of the spindles 64 to positions that are relatively close to each other in positions determined by the engagement of the bars 94 with the stop bolts 102; the piston rods 114 are projected out of the motors 108 to thereby move the nozzles 70 about the axis of the spindles 58 to raised positions; and the cylinder 132 is retained in a lowered position in the block 116 by the springs 136 to thereby lower the stop surface 150 out of intersecting relationship with respect to the beam 154 and respectively lower the valves 142, 144 and 146 out of intersecting relationship with respect to the cams 156, 158 and 160.

Molten [thermoslastic] *thermoplastic* cement is caused to gravitate from the cement pot 42 through the passage means 86 up to the valves 92 in the nozzle mounts 82.

Figure 11:
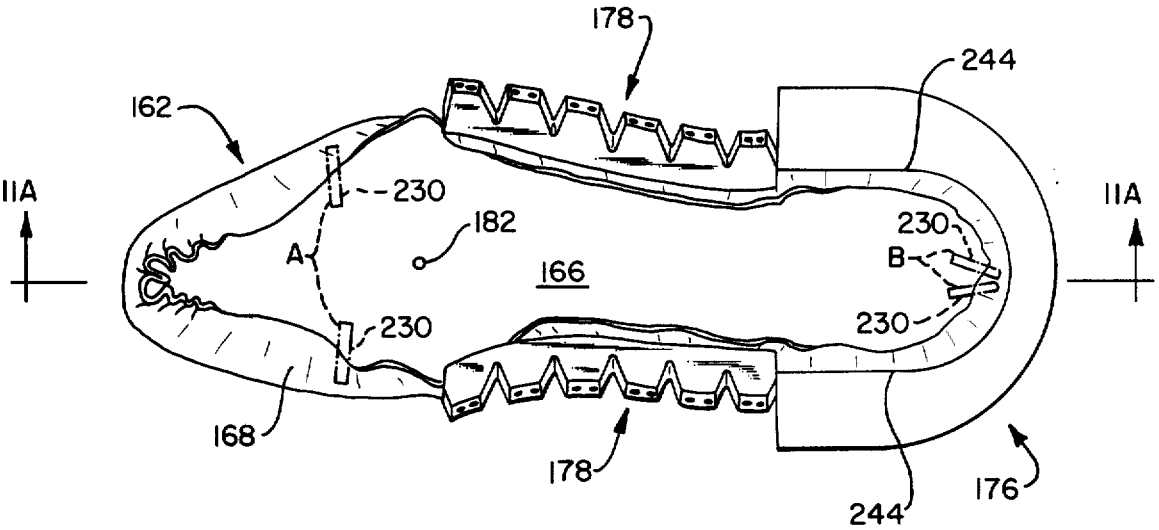
FIG. 11 is a plan view of the workpiece as it appears in the machine during the cement applying stroke.
Figure 11A:
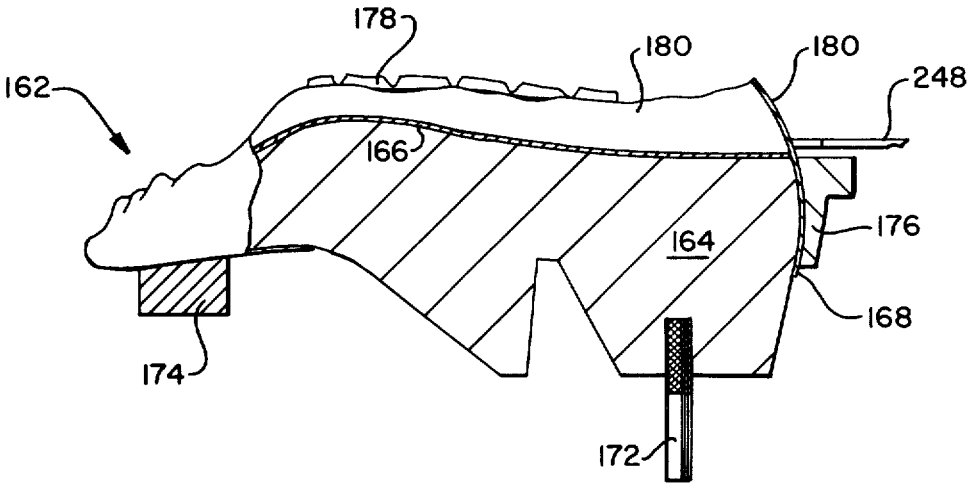
FIG. 11A is a section taken along the line 11A—11A of FIG. 11.

Referring to FIGS. 11 and 11A, a shoe assembly 162 comprising a last 164 having an insole 166 located on its bottom and an upper 168 mounted thereon is placed bottom up on a support 170 (see also FIG. 1) comprised of a last pin 172 and a toe rest 174 with the vamp of the shoe assembly resting on the toe rest 174 and with the last pin 172 inserted into the thimble in the back portion of the last so that the toe of the shoe assembly faces forwardly. Prior to placement in the machine, the shoe assembly 162 had been toe lasted.

In the manner disclosed [in application Ser. No. 467,522] *U.S. Pat. No. 3,963,840*, the machine is now operated to bring the shoe assembly engaging parts to the position shown in FIGS. 11 and 11A wherein a heel clamp pad 176 presses the heel portion of the upper 168 against the last 164 and side lasting instrumentalities 178 press the side portions of the upper against the last with the heel and side portions of the upper margin 180 extending upwardly of the insole 166. After this, the motor 26 is actuated so as to cause the cables 34 to move the slide plate 24 and the parts carried thereby, including the nozzles 70, forwardly until the nozzles 70 are over the widest part of the shoe assembly, indicated by number 182 in FIG. 11, , at which time a valve actuating rod mounted for movement with the plate 24 engages a stop lug to stop the forward movement of the plate 24 and the nozzles 70 and to cause a valve 184 (FIG. 10) to open, as shown in [application Ser. No. 467,522] *U.S. Pat. No. 3,963,840.*

Figure 10:
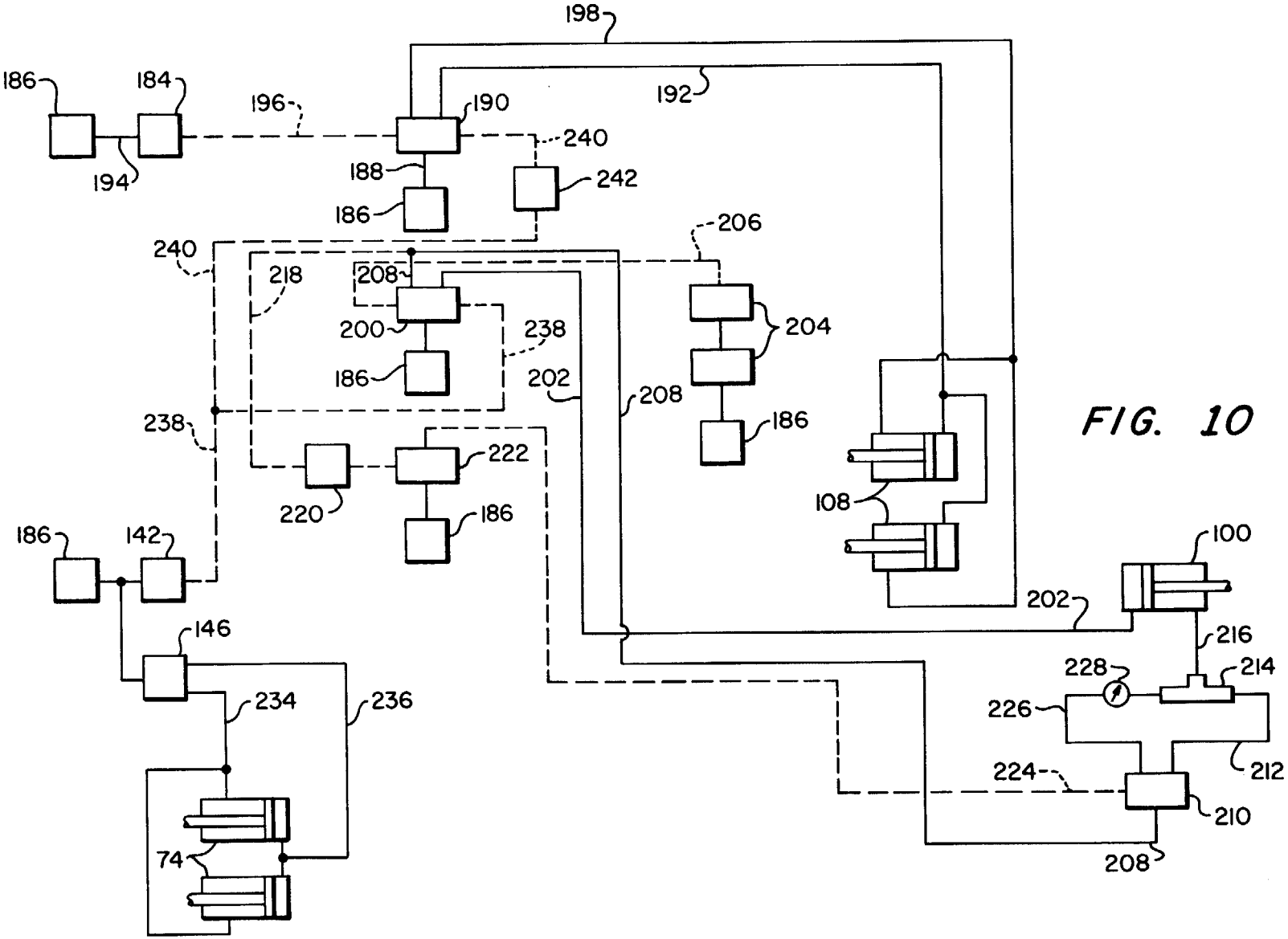
FIG. 10 is a schematic representation of a portion of the machine control circuit.

Referring to FIG. 10, the motors 108 are maintained in their idle positions by pressurized air passing from a source 186 through a line 188, a valve 190 and a line 192 to the blind ends of these motors. The opening of the valve 184 sends air from the source 186 through a line 194, the valve 184 and a pilot line 196 to the left side of the valve 190 to shift the valve 190. This shifting of the valve 190 vents the air from the blind ends of the motors 108 through the line 192 and the valve 190 and enables pressurized air to pass from the valve 190 through a line 198 to the rod ends of the motors 108 to thereby retract the piston rods 114 into the motor 108 and thus cause the nozzles 70 to be lowered under the yieldable force of the pressurized air in the motors 108 until they engage the insole 166 in the general region indicated by number 182 in FIG. 11 wherein the nozzles are spaced from the upper margin 180 and the insole periphery inwardly of the side portions of the upper margin and the corresponding portions of the insole periphery that are between the toe and heel portions of the shoe assembly.

The motor 100 is maintained in its idle condition by pressurized air passing from the source 186 through a valve 200 and a line 202 to the motor 100. The lowering of the nozzles 70 causes valves 204, which are normally closed, to open. The opening of the valves 204 enables pressurized air to pass from the source 186 through the valves 204 and a pilot line 206 to the left side of the valve 200 to shift this valve. The shifting of the valve 200 enables the air in the line 202 to vent to atmosphere through the valve 200 and enables pressurized air to flow from the valve 200 through a line 208, a valve 210, a line 212, a shuttle valve 214 and a line 216 to motor 100 to so actuate the motor 100 as to move the yokes 98 inwardly under the yieldable force of the pressurized air operating under relatively high full line pressure in the line 216 and thus move the nozzles 70 outwardly under relatively high pressure along the insole 166 into the angle between the insole and the upper margin 180 until the nozzles reach the corners between the insole and the upper margins as indicated in FIG. 12.

By means not shown, the opening of the valves 204 also shuts off the flow of pressurized air to the motors 54 so that the return springs of these motors retract their piston rods 56 out of engagement with the bolt heads 52 to thereby enable the motor 100 to move the nozzles 70 outwardly.

The aforementioned shifting of the valve 200 that had caused the pressurized air to flow through the line 208 to the motor 100 also enabled pressurized air to flow from the line 208 through a pilot line 218 and a pneumatic timer 220 in the line 218 to the left side of a valve 222 to shift the valve 222 after a time delay provided by the timer 220. The shifting of the valve 222 enables pressurized air to flow from the source 186 through the valve 222 and a pilot line 224 to the left side of the valve 210 to shift the valve 210. The shifting of the valve 210 cuts off the flow of pressurized air through the line 212 and enables pressurized air to flow under relatively low pressure from the valve 210 through a line 226, a pressure regulator 228 in the line 226 set at a pressure lower than the pressure of the air that had flowed through the line 212, the shuttle valve 214 and the line 216 to the motor 100 to cause the motor 100 to urge the nozzles 70 outwardly into the corners between the insole 166 and the upper margin 180 at a lower pressure than they had been originally urged outwardly.

At this time, the nozzle bottoms 230 project outwardly of the longitudinal center line of the shoe assembly 162, as indicated by position A in FIG. 11, with the nozzle tips 232 pointing outwardly and laterally away from each other, the arms 78, gears 80 and 84, nozzle mounts 82, nozzles 70 and nozzle bottoms 230 being so constructed as to enable this to take place when the piston rods 76 are retracted into the motors 74.

Now the stop lug is caused to be disengaged from the valve actuating rod to thus cause the valve 184 to close and enabling the motor 26 to again move the plate 24 and the nozzles 70 forwardly. During this resumption of the forward movement of the nozzles 70, they are resiliently urged downwardly against the insole 166 by the motors 108 and are resiliently urged outwardly against the upper margin 180 under relatively low pressure by the motor 100 so that they are bearing against the insole and the upper margin when they stop their forward motion as described below.

The machine control is so constructed that the plate 24 terminates its forward movement when the nozzles are located at the boundaries between the wiped toe portion of the upper margin and the unwiped side portions of the upper margin after which the motor 26 is caused to reverse its movement and move the slide plate 24 and the nozzles 70 rearwardly. At the same time as the slide plate 24 and the nozzles 70 commence their rearward movement, cement is forced from the cement pot through the passage means 86, past the check valves 92 and through the passages 88 in the nozzles 70 into the angle between the upper margin 180 and the insole 166.

The aforementioned opening of the valve 184 causes pressurized air to flow into the bottom of the cavity 134 to thereby raise the cylinder 132 to bring the stop surface 150 into intersecting relationship with the beam 154 and to bring the valve assembly 140 into intersecting relationship with the cam assembly 161. At this time the beam 154 is forward of the flange 148 and the cam assembly 161 is forward of the valve assembly 140 so that the beam 154 does not intersect the flange 148 and the cam assembly 161 does not intersect the valve assembly 140 during the forward movement of the plate 24. The plate 24, together with the nozzles 70, continues its rearward movement until the back of the beam 154 engages the stop surface 150. As disclosed more particularly in [application Ser. No. 467,522] *U.S. Pat. No. 3,963,840*, the stop surface 150 is located in a forward-rearward position that is dependent on the forward-rearward position of the heel end extremity of the shoe assembly 162 and the machine parts are so dimensioned that the nozzles 70 are located proximate to the heel end extremity of the shoe assembly 162.

The motors 74 are maintained in their idle positions by pressurized air passing from the source 186 through the valve 146 and a line 234 to the rod ends of the motors 74. Shortly before the beam 154 engages the stop surface 150 to terminate the rearward movement of the nozzles 70, the cam 160 engages the valve 146 to shift this valve. The shifting of the valve 146 terminates the flow of air to the motors 74 through the line 234 and causes pressurized air to flow from the valve 146 through a line 236 to the blind ends of the motors 74 to thereby project the piston rods 76 out of the motors 74. This projection of the piston rods 76, by means of the connections provided by the arms 78 and the gears 80 and 84, causes the nozzles 70 to swing inwardly about the axes of the nozzle mounts 82 through arcs of about 110 degrees to position wherein the nozzle bottoms 230 lie on axes that are approximately parallel to the longitudinal axis of the shoe assembly 162 and the nozzle tips 232 point towards the heel and extremity of the shoe assembly, as indicated by position B in FIG. 11.

Between the time that the valve 146 is shifted by the cam 160 and the rearward movement of the nozzles 70 is terminated by the engagement of the beam 154 with the stop surface 150, the valve 142 is shifted by the cam 156. The shifting of the valve 142 enables pressurized air to flow from the source 186 through the valve 142 and a pilot line 238 to the right side of the valve 200 to thereby shift this valve back to its original position so that the flow of air in the line 208 is cut off and pressurized air again flows through the line 202 to the motor 100 to thereby cause the motor 100 to swing the nozzles inwardly and towards each other until the bars 94 engage the stop bolts 102.

The shifting of the valve 142 also causes the motors 54 to return to their idle positions.

The shifting of the valve 142 also enables pressurized air to flow from the line 238 through a pilot line 240 and a pneumatic timer 242 in the line 240 to the right side of the valve 190 to thereby shift this valve back to its original position so that the flow of air in the line 198 is cut off and pressurized air again flows through the line 192 to the motors 108 to cause the motors 108 to return to their idle positions to thereby raise the nozzles 70 to their idle positions after a time delay imparted by the timer 242.

Shortly before the rearward movement of the nozzles 70 is terminated by the engagement of the beam 154 with the stop surface 150, the valve 144 is shifted by the cam 158 to cause the termination of the extrusion of cement through the nozzles 70.

From the foregoing, it can be seen that each of the nozzles 70 is caused to move rearwardly in a cement applying stroke between an initial location at a boundary between an unwiped side portion of the [show] *shoe* assembly 162 and the previously wiped toe portion of the shoe assembly and a final location at the heel end extremity of the shoe assembly. A portion 250 of the nozzle passage 88, which extends radially of the upright axis about which the nozzle is swung by the motor 74, acts as a cement flow directing means that directs the flow of cement from the nozzle radially of the axes. At the beginning of the cement applying stroke, the motor 74 so constrains the nozzle 70 that the cement flow directing means 250 is directed laterally of the rearward direction of movement of the cement applying stroke and outwardly of the upright axis of swinging movement of the nozzle. When, during the cement applying stroke, the nozzle 70 arrives at an intermediate location wherein the heel portion of the shoe assembly commences to curve rearwardly and inwardly as determined by the engagement of the actuating member formed by the cam 160 with the operating member formed by the valve 146, the motor 74 is actuated to swing the nozzle 70 rearwardly and inwardly so that the cement flow directing means 250 is directed generally rearwardly of the upright axis of swinging movement of the nozzle 70 at the conclusion of the cement applying stroke. The cessation of the outward movement of the nozzle 70 by the motor 100 caused by the engagement of the actuating member formed by the cam 156 with the operating member formed by the valve 142 and the concomitant inward movement of the nozzle to the extent permitted by the stop means formed by the stop bolt 102, when the nozzle 70 is between its intermediate and final locations, ensures that the cement flow directing means 250 is pointing to the heel end extremity so as to apply cement thereto at the conclusion of the cement applying stroke.

During the cement applying stroke the nozzle 70 are continuously being urged downwardly against the insole 166 by the motors 108 and, until the valve 142 is actuated, are continuously being urged outwardly against the upper margin 180 by the motor 100, as shown in FIG. 12, while cement is continuously being extruded from the cement flow directing means 250 through openings 246 (FIG. 7) in the nozzle bottoms 230 into the angle between the upper margin 180 and the insole 166. Therefore, during this movement, the nozzle bottoms 230 and the cement flow directing means 250 are extending substantially at right angles to the sides of the insole periphery and are able to remain in the angle between the insole 166 and the upper margin 180 in desirable positions for the extrusion of cement regardless of the contour of the bottom of the insole and regardless of the contour of the insole periphery.

As the nozzles 70 move rearwardly past the intermediate locations and the regions 244, they are swung inwardly towards each other and rearwardly about the axes of the nozzle mounts 82 so that the nozzle bottoms 230 and the cement flow directing means 250 will continue to extend substantially at right angles to the insole periphery during the movement of the nozzles from the regions 244 to the heel and extremity of the shoe assembly. The cement extrusion through the nozzle openings 246 into the angle between the upper margin 180 and the insole periphery 166 continues until the nozzles arrive at the B position of FIG. 11 wherein the nozzles are spaced close to each other so that there is substantially no gap in the cement extruded in this angle at the heel end extremity of the shoe assembly 162. The close proximity of the nozzles 70 at the heel end extremity of the shoe assembly is ensured by the termination of the outwardly directed force applied to the nozzles by the motor 100 and the application of inwardly directed forces to the nozzles by this motor as the nozzles near this heel end extremity. The termination of the cement extrusion just before the nozzles arrive at this heel end extremity ensures a depositing of the cement into the angle between the insole 166 and the upper margin 180 right up to this heel end extremity. After the nozzles 70 arrive at the B position of FIG. 11 they are raised upwardly of the shoe assembly 162 by the motors 108.

After the nozzles 70 have been raised clear of the shoe assembly 162, the side lasting instrumentalities 178 are, in the manner disclosed in [application Ser. No. 467,522 ] *U.S. Pat. No. 3,963,840*, caused to wipe or fold the side portions of the upper margin 180 against the insole 166 and bond these portions of the upper margin to the insole by means of the previously applied cement and then move out of engagement with the shoe assembly. This is followed by the operation of heel wipers 248 (FIGS. 1, 2 and 11A) in a heel wiping stroke wherein they move forwardly and inwardly to wipe or fold the heel portion of the upper margin 180 against the insole 166 and then move out of engagement with the shoe assembly 162.

At about the same time as the heel wiping stroke the flow of pressurized air to the cylinder 132 is cut off to thereby enable the springs 131 to lower the cylinder 132 to its idle position to thereby lower the stop surface 150 out of intersecting relationship with the beam 154 and to thereby lower the valve assembly 140 away from the cam assembly 161 so as to enable the conventional return springs in the valves 142, 144 and 146 to shift these valves to their original positions. The lowering of the stop surface 150 out of intersecting relationship with the beam 154 enables the motor 26 to resume the rearward movement of the plate 24 and the nozzles 70 until they reach their idle positions. After this the machine parts that have not already done so are returned to their idle positions and the machine cycle is completed so that the lasted shoe assembly 162 can be removed from the machine.

In the illustrative embodiment of the invention, there is shown a pair of nozzles that are simultaneously moved towards the heel end extremity of a shoe assembly. However, in its broadest aspects the invention has utility [wherein only one nozzle is caused to move rearwardly for applying cement and/or] wherein the cement is applied to a different workpiece. For example, the invention can be utilized in applying cement into the angle between an upper margin and an insole periphery of the toe portion of a shoe assembly having a rounded toe [wherein first one nozzle applies cement along one side of the shoe assembly and then a second nozzle applies cement along the other side of the shoe assembly].

I claim:

1. A cement applying mechanism comprising: a [nozzle] *pair of laterally spaced nozzles* mounted for movement in [a] rearward [direction] *directions* in [a] cement applying [stroke] *strokes* between [an] initial [location] *locations* and [a] final [location] *locations* and mounted for swinging movement about [an] upright [axis] *axes*; cement flow directing means in [said] *each* nozzle, through which cement may be extruded from *each* said nozzle, extending radially from [said] *its associated* axis; *means mounting each nozzle for inward-outward movement; stop means limiting the extent of inward movement of the nozzles;* means for moving the [nozzle] *nozzles* through said cement applying [stroke] *strokes*; means so constraining the [nozzle] *nozzles* that said cement flow directing means [is] *are* directed laterally of said rearward [direction] *directions* and outwardly from [said axis] *their associated axes* during movement of the [nozzle] *nozzles* in said cement applying [stroke] *strokes* from said initial [location] *locations* to [an] intermediate [location] *locations* between said initial and final locations; [and] *means yieldably urging the nozzles outwardly at the beginning of the cement applying strokes;* means operative when the [nozzle has] *nozzles have* reached said intermediate [location] *locations* to so swing the [nozzle] *nozzles* rearwardly and inwardly about [said axis] *their associated axes* that said cement flow directing means [is] *are* directed generally rearwardly from [said axis] *their associated axes* when the [nozzle has] *nozzles have* arrived at said final [location] *locations; and means, effective when the nozzles are between their associated intermediate and final locations, to cease the outward urging of the nozzles and to cause the nozzles to be urged inwardly to extents determined by said stop means.*

[2. The mechanism of claim 1 further comprising: a forwardly facing stop surface; an operating member located forwardly of said stop surface; a beam, located forwardly of the stop surface in intersecting relationship with the stop surface, mounted for rearward movement with the nozzle, the engagement of the beam with the stop surface being determinative of said final nozzle location; an actuating member mounted to the beam for rearward movement therewith in intersecting relationship with the operating member, the intersection of the actuating member with the operating member being determinative of said intermediate nozzle location; and means responsive to the intersection of the actuating member with the operating member for swinging the nozzle as aforesaid.]

[3. The mechanism of claim 1 further comprising: a nozzle carrier; a nozzle mount, to which the nozzle is affixed, mounted to said carrier for swinging movement about said axis to thereby form said mounting of the nozzle for swinging movement about said axis; means mounting the carrier for rearward movement to thereby form said mounting of the nozzle for movement in said rearward direction; means for moving the carrier rearwardly to thereby form the means for moving the nozzle through said cement applying stroke; a motor mounted to the nozzle carrier; and connecting means extending between the motor and the nozzle mount; wherein said means for constraining the nozzle as aforesaid comprises means for causing the motor to enable said connecting means to so position the nozzle mount that said cement flow directing means is directed laterally of said rearward direction and outwardly from said axis; and wherein said means to swing the nozzle as aforesaid comprises means for actuating the motor to cause the connecting means to so swing the nozzle mount about said axis that the nozzle swings rearwardly and inwardly as aforesaid.]

[4. The mechanism of claim 3 further comprising: a forwardly facing stop surface; an operating member located forwardly of said stop surface; a beam located forwardly of the stop surface in intersecting relationship with the stop surface mounted for rearward movement with the nozzle carrier, the engagement of the beam with the stop surface being determinative of said final nozzle location; an actuating member mounted to the beam for rearward movement therewith in intersecting relationship with the operating member, the intersection of the actuating member with the operating member being determinative of said intermediate nozzle location; and means responsive to the intersection of the actuating member with the operating member for causing the motor to swing the nozzle mount as aforesaid.]

[5. The mechanism of claim 1 further comprising: means mounting the nozzle for inward-outward movement; stop means limiting the extent of inward movement of the nozzle; means yieldably urging the nozzle outwardly at the beginning of the cement applying stroke; and means, effective when the nozzle is between said intermediate and final locations, to cease the outward urging of the nozzle and to cause the nozzle to be urged inwardly to an extent determined by said stop means.]

6. The mechanism of claim [5] *1* further comprising: a forwardly facing stop surface; a first operating member and a second operating member located forwardly of said surface; a beam, located forwardly of the stop surface in intersecting relationship with the stop surface, mounted for rearward movement with the [nozzle] *nozzles*, the engagement of the beam with the stop surface being determinative of said final nozzle [location] *locations*; a first actuating member mounted to the beam for rearward movement therewith in intersecting relationship with the first operating member, the intersection of the first actuating member with the first operating member being determinative of said intermediate nozzle [location] *locations*; means responsive to the intersection of the first actuating member with the first operating member for swinging the [nozzle] *nozzles* as aforesaid; a second actuating member mounted to the beam for rearward movement therewith in intersecting relationship with the second operating member, the second operating member and the second actuating member being so constructed and arranged that their intersection takes place when the [nozzle is] *nozzles are* between said intermediate and final locations; and means responsive to the intersection of the second actuating member with the second operating member to cause said cessation of the outward urging of the [nozzle] *nozzles* and to cause said inward urging of the [nozzle] *nozzles*.

7. The mechanism of claim [5] *1* further comprising: a *pair of* nozzle [carrier] *carriers*; a nozzle mount, to which *each of* the [nozzle] *nozzles* is affixed, mounted to *each of* said [carrier] *carriers* for swinging movement about [said] *its associated* axis to thereby form said mounting of the [nozzle] *nozzles* for swinging movement about said [axis] *axes*; means mounting the [carrier] *carriers* for rearward movement to thereby form said mounting of the [nozzle] *nozzles* for movement in said rearward [direction] *directions*; means for moving the [carrier] *carriers* rearwardly to thereby form the means for moving the [nozzle] *nozzles* through said cement applying [stroke] *strokes*; a motor mounted to [the] *each* nozzle carrier; and connecting means extending between [the] *each* motor and [the] *its associated* nozzle mount; wherein said means for constraining the [nozzle] *nozzles* as aforesaid comprises means for causing the [motor] *motors* to enable said connecting means to so position the nozzle [mount] *mounts* that said cement flow directing means [is] *are* directed laterally of said rearward [direction] *directions* and outwardly from [said axis] *their associated axes*; and wherein said means to swing the [nozzle] *nozzles* as aforesaid comprises means for actuating the [motor] *motors* to cause the connecting means to so swing the nozzle [mount] *mounts* about [said axis] *their associated axes* that the [nozzle swings] *nozzles swing* rearwardly and inwardly as aforesaid.

8. The mechanism of claim 7 further comprising: a forwardly facing stop surface; a first operating member and a second operating member located forwardly of said surface; a beam, located forwardly of the stop surface in intersecting relationship with the stop surface, mounted for rearward movement with the nozzle [carrier] *carriers*, the engagement of the beam with the stop surface being determinative of said final nozzle [location] *locations*; a first actuating member mounted to the beam for rearward movement therewith in intersecting relationship with the first operating member, the intersection of the first actuating member with the first operating member being determinative of said intermediate nozzle [location] *locations*; means responsive to the intersection of the first actuating member with the first operating member for causing the [motor] *motors* to swing the nozzle [mount] *mounts* as aforesaid; a second actuating member mounted to the beam for rearward movement therewith in intersecting relationship with the second operating member, the second operating member and the second actuating member being so constructed and arranged that their intersection takes place when the [nozzle is] *nozzles are* between said intermediate and final locations; and means responsive to the intersection of the second actuating member with the second operating member to cause said cessation of the outward urging of the [nozzle] *nozzles* and to cause said inward urging of the [nozzle] *nozzles*.

* * * * *